US 8,621,605 B2

(12) United States Patent
Burugula et al.

(10) Patent No.: US 8,621,605 B2
(45) Date of Patent: Dec. 31, 2013

(54) METHOD FOR REDUCING THE TIME TO DIAGNOSE THE CAUSE OF UNEXPECTED CHANGES TO SYSTEM FILES

(75) Inventors: Ramanjaneya Sarma Burugula, Peekskill, NY (US); Joefon Jann, Ossining, NY (US); Pratap Chandra Pattnaik, Ossining, NY (US)

(73) Assignee: International Business Machines Corporation, Armonk, NY (US)

( * ) Notice: Subject to any disclaimer, the term of this patent is extended or adjusted under 35 U.S.C. 154(b) by 1560 days.

(21) Appl. No.: 11/869,504

(22) Filed: Oct. 9, 2007

(65) Prior Publication Data

US 2009/0094676 A1    Apr. 9, 2009

(51) Int. Cl.
    *H04L 29/06*    (2006.01)
(52) U.S. Cl.
    USPC ....... 726/22; 726/2; 726/26; 726/27; 713/164
(58) Field of Classification Search
    USPC ....................................... 726/26, 22; 713/164
    See application file for complete search history.

(56) References Cited

U.S. PATENT DOCUMENTS

| 5,557,742 | A * | 9/1996 | Smaha et al. ................. 726/22 |
| 6,219,706 | B1 * | 4/2001 | Fan et al. ..................... 709/225 |
| 6,347,374 | B1 * | 2/2002 | Drake et al. .................... 726/1 |
| 6,477,665 | B1 | 11/2002 | Bowman-Amuah |
| 6,505,300 | B2 * | 1/2003 | Chan et al. ................... 713/164 |
| 6,973,643 | B2 | 12/2005 | Goldsmith |
| 7,143,288 | B2 * | 11/2006 | Pham et al. .................. 713/165 |
| 7,664,924 | B2 * | 2/2010 | Safa ............................... 711/163 |
| 7,707,620 | B2 * | 4/2010 | Cherepov ......................... 726/1 |
| 2004/0128583 | A1 | 7/2004 | Iulo et al. |
| 2004/0205399 | A1 | 10/2004 | Wang et al. |
| 2005/0102567 | A1 | 5/2005 | McGuire et al. |
| 2006/0123005 | A1 * | 6/2006 | Burnett et al. .................... 707/9 |
| 2009/0049047 | A1 * | 2/2009 | Battepati et al. .................. 707/9 |

OTHER PUBLICATIONS

Gene H. Kim and Eugene H. Spafford, "The Design and Implementation of Tripwire: A File System Integrity Checker," Purdue University, 1994.

* cited by examiner

*Primary Examiner* — Mohammad L Rahman
(74) *Attorney, Agent, or Firm* — Michael J. Buchenhorner

(57) ABSTRACT

A method for monitoring access to a file within a file system includes steps or acts of: monitoring a plurality of requests for access to files; intercepting the requests; and analyzing metadata located in the file. If the metadata includes a directive entry, the method includes these additional steps: identifying information about any application requesting access to the file, including a sequence of function calls that preceded the file access request; and logging the information to generate an action trail of the application. A mechanism for monitoring file access includes the following: a file system configured for monitoring accesses to any file residing within it; an access control mechanism which can execute pre-defined actions when an unauthorized file access occurs; and a tool to specify the list of files to be monitored.

15 Claims, 6 Drawing Sheets

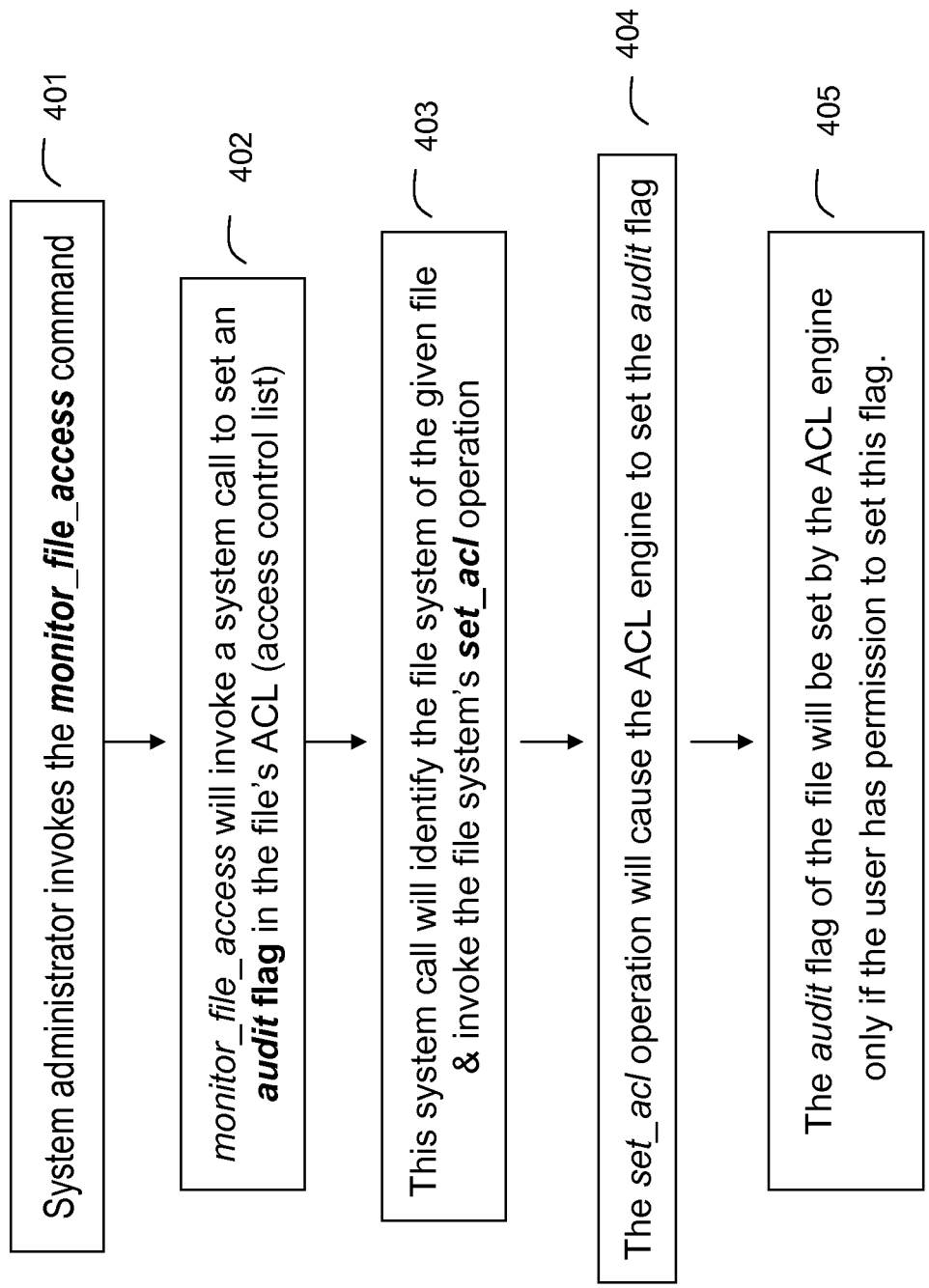
FIG. 4: The *monitor_file_access* command

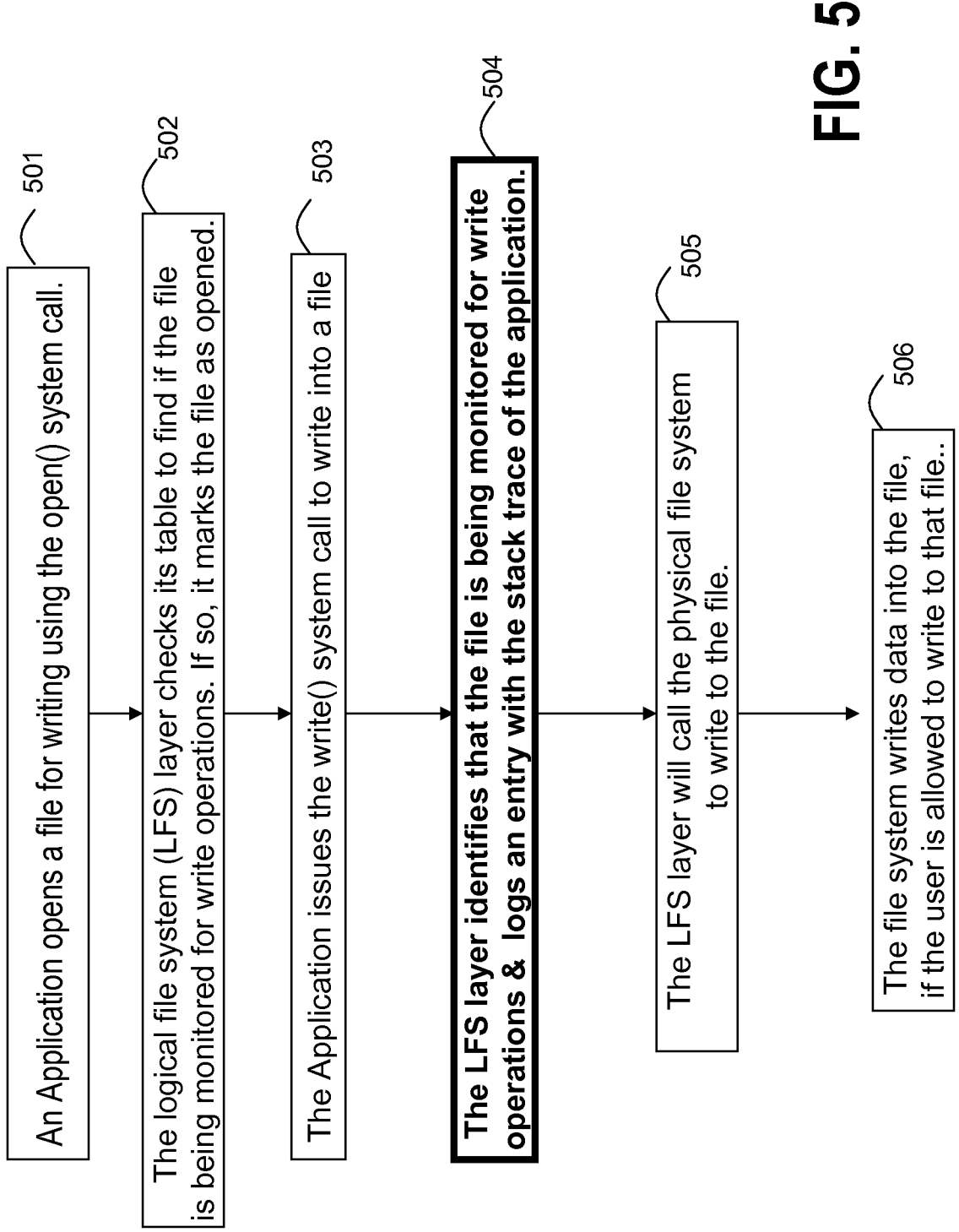

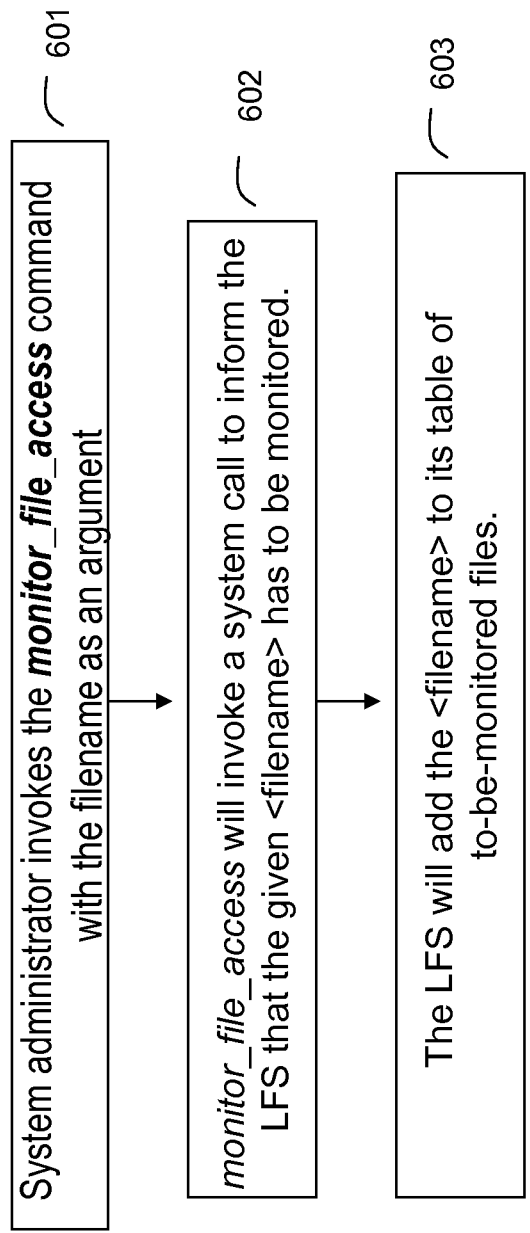
FIG. 6 The *monitor_file_access* command

METHOD FOR REDUCING THE TIME TO DIAGNOSE THE CAUSE OF UNEXPECTED CHANGES TO SYSTEM FILES

CROSS-REFERENCE TO RELATED APPLICATIONS

None.

STATEMENT REGARDING FEDERALLY SPONSORED-RESEARCH OR DEVELOPMENT

None.

INCORPORATION BY REFERENCE OF MATERIAL SUBMITTED ON A COMPACT DISC

Not Applicable.

FIELD OF THE INVENTION

The invention disclosed broadly relates to the field of computer operating system serviceability and more particularly relates to the field of monitoring and controlling file access to diagnose the cause of unexpected behavior by the operating system.

BACKGROUND OF THE INVENTION

Operating system administrators often encounter maintenance issues that are caused by the unexpected actions of applications. For example, an application may change the permissions of a device file or modify a system configuration file that is used by multiple applications. The modifications in these files can cause other applications to fail. These incidents are difficult to diagnose because they occur randomly, and in most cases, it is difficult to identify the specific application that caused the error.

There is a need for a method and mechanism to overcome the stated shortcomings of the known art.

SUMMARY OF THE INVENTION

Briefly, according to an embodiment of the invention, a method for monitoring access to a file within a file system includes steps or acts of: monitoring all requests for access to files; intercepting all of the requests; and analyzing metadata located in the file. If the metadata includes a directive entry, the method includes these additional steps: identifying information about any application requesting access to the file, including a sequence of function calls that preceded the file access request; and logging the information to generate an action trail of the application.

A mechanism for monitoring file access includes the following: a file system configured for monitoring accesses to any file residing within it; an access control mechanism which can execute pre-defined actions when an unauthorized file access occurs; and a tool to specify the list of files to be monitored.

According to another embodiment of the present invention, a computer program product embodied on a computer readable medium includes code that, when executed, causes a computer to perform the following acts: monitor all requests for access to files; intercept all of the requests; and analyze metadata located in the file. Further, if the metadata includes a directive entry, the code further causes the computer to: identify information about any application requesting access to the file, including a sequence of function calls that preceded the file access request; and log the information to generate an action trail of the application.

The method can be implemented either as machine executable instructions executed by a programmable information processing system or as hard coded logic in a specialized computing apparatus such as an application-specific integrated circuit (ASIC).

BRIEF DESCRIPTION OF THE DRAWINGS

To describe the foregoing and other exemplary purposes, aspects, and advantages, we use the following detailed description of an exemplary embodiment of the invention with reference to the drawings, in which:

FIG. 4 illustrates the sequence of steps taken when a system administrator asks a file to be monitored, using the embodiment illustrated in FIG. 3;

FIG. 5 illustrates a new sequence of actions according to an alternative embodiment of the present invention; and FIG. 6 illustrates a sequence of actions for the monitor_file_access command, according to the alternative embodiment illustrated in FIG. 5.

Figure 1:
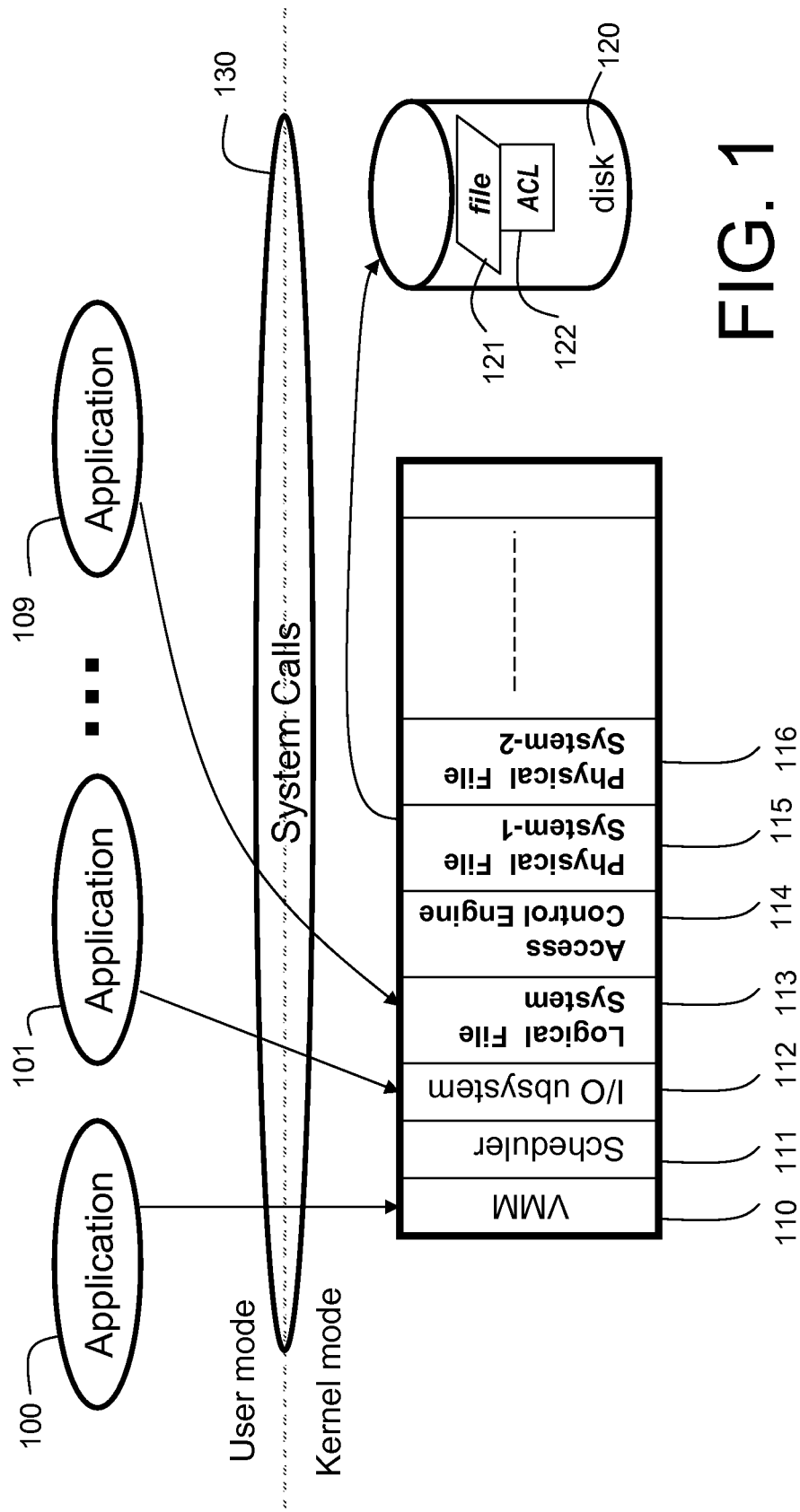
FIG. 1 illustrates various components involved in the invention: user mode applications, kernel components (of which file-system is one), and the hard disks where the files may reside.

While the invention as claimed can be modified into alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the scope of the present invention.

DETAILED DESCRIPTION

We describe a method for monitoring file access. This method alerts a system administrator whenever an offending application accesses a file, and also provides information about the application. The objective is to enhance the serviceability of computer operating systems (i.e. reduce the unplanned outage time) by providing a synchronous, accurate, and very low overhead method to generate an action trail of the erroneous/offending application. This invention provides the ability to pinpoint the exact application and the specific operations within that application that caused the system or outage problem.

According to an embodiment of the present invention, this is accomplished by intercepting a given type of access to a file and by identifying the details of the application that accessed that file, including the sequence of function calls which preceded the access to the file. The identification of the application and the function calls is done by walking the stack when the file modification/deletion event occurs. The interception of accesses to the file is accomplished by adding an ACL (Access Control List) entry associated with the file system object that directs the file system to record a log entry whenever a specific access is requested on the file. At a high level, the following steps describe a typical scenario where the mechanisms of our invention are applied:

Referring now in specific detail to the drawings, and particularly FIG. 1, there is illustrated an exemplary embodiment of the present invention, wherein an operating system running on a multi-processor machine has kernel components that manage various hardware resources in the machine and provide abstractions of these resources to the applications 100, 101, through 109. The applications 100, 101-109 running in user mode use system calls 130 to utilize the kernel abstractions of the hardware resources. FIG. 1 shows multiple applications (100 through 109) running in an operating system. The operating system's kernel typically contains several components such as a Virtual Memory Manager (110 VMM), a Scheduler (111), an I/O subsystem (112), a Logical File System (113), an Access Control Engine (114), and multiple physical file systems (115,116 . . . ), and other components.

The applications 100-109 access the hardware resources managed by the OS kernel via system call interfaces 130. The physical file systems store their file contents onto a hard disk 120. Each file 121 has associated meta-data, of which the Access Control List (ACL) 122 is one type of meta-data.

Figure 2:
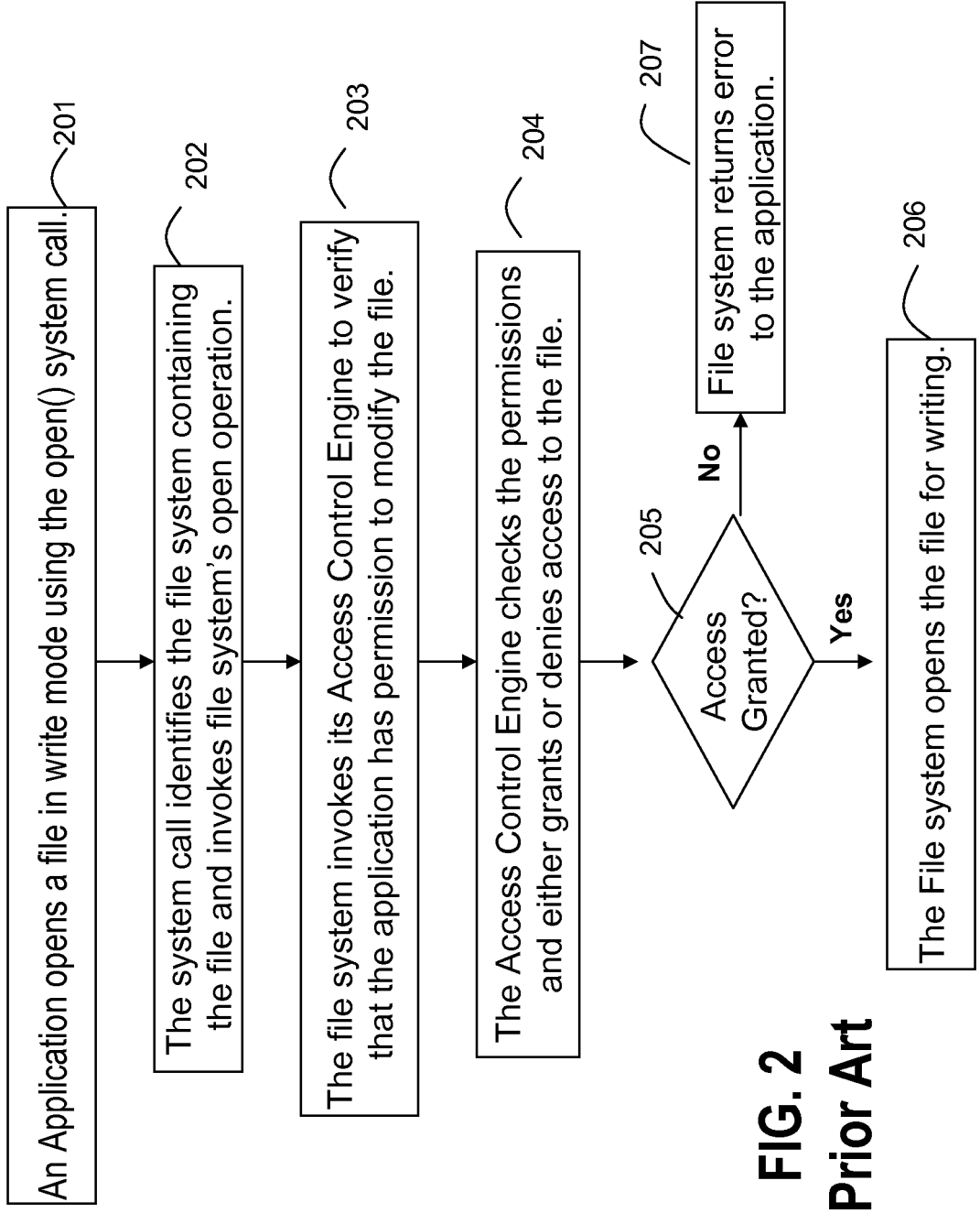
FIG. 2 illustrates the sequence of actions taken by various components in the existing art when an application tries to access a file in a file-system.

FIG. 2 illustrates an exemplary flowchart of file access control flow when an application 100 tries to modify a file 121, according to the known art. In step 201, application 100 opens the file 121 in write mode by invoking a system call open( ) which transfers control of execution from user mode into kernel mode.

In step 202, the open( ) system call implemented in the logical file system 113 identifies the physical file system 115 associated with the file 121, and invokes the file-system operation provided by that physical file system 115 to perform the open to the file 121.

In step 203, the physical file system 115 calls Access Control Engine 114 to verify that the user of the Application program 100 has permissions to write to the file 121. In step 204, the Access Control Engine 114 reads and analyzes file 121's Access Control List (ACL) 122 to determine whether the user has permissions to write to the file 121.

In step 205, the Access Control Engine 114 decides whether to allow the application 100 to write to the file 121 or not. If the access is allowed, in step 206, the physical file system 115 successfully opens the file 121 for writing and returns a handle that uniquely identifies the opened file. If the access denied, in step 207, the physical file system 115 returns an error to the application 100.

The format and content of the Access Control List (ACL) 122 varies with the different file system types and their implementations. In file systems that are compliant with the NFS (Network File System) Version 4 specification, the ACL format allows us to specify a directive known as an audit entry which can be used to invoke a specific action, such as writing a log record, whenever that entry is present.

Figure 3:
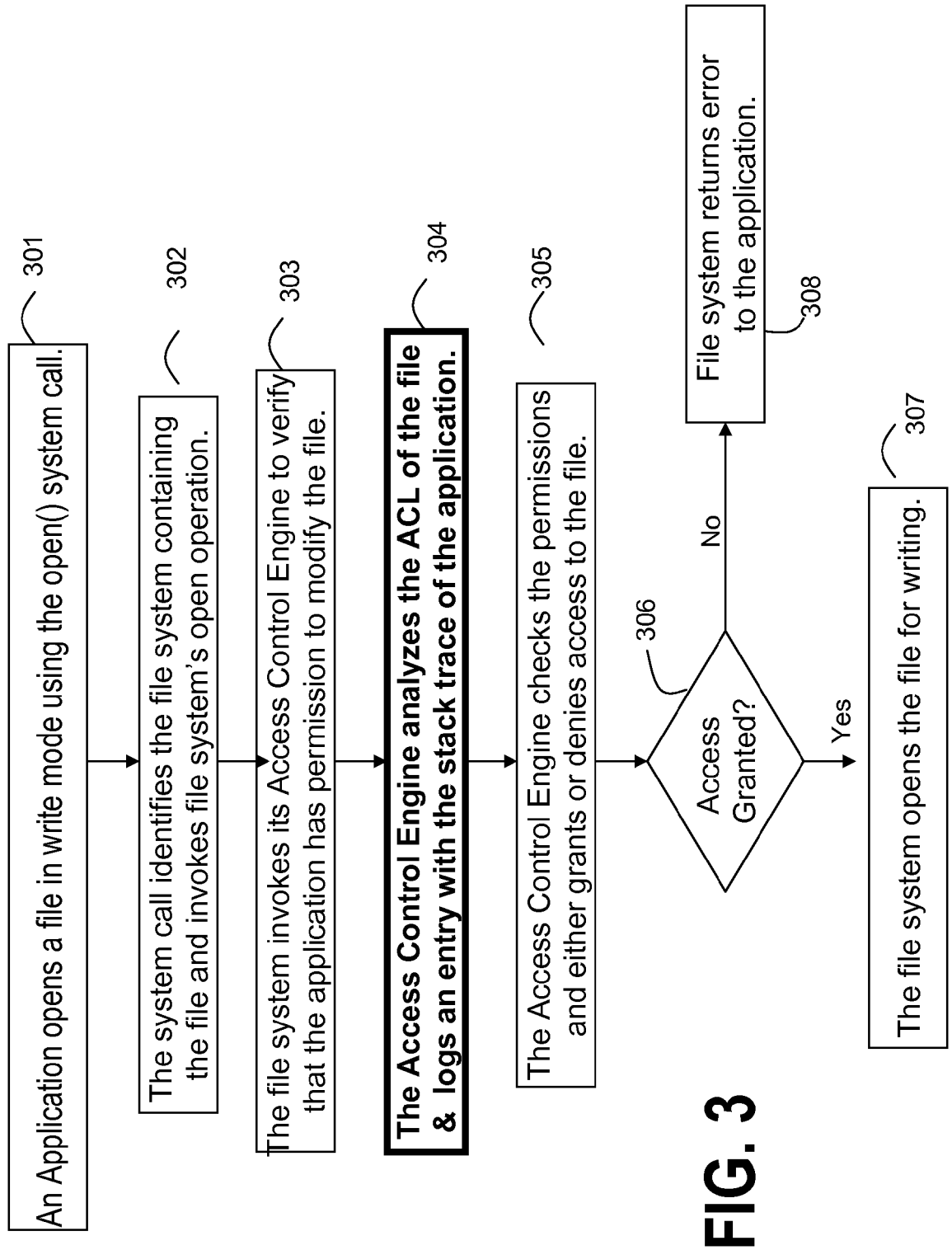
FIG. 3 illustrates the new sequence of actions taken by various components when an application tries to access a file in a file-system, according to an embodiment of the present invention.

FIG. 3 illustrates the sequence of actions taken when an application tries to modify the contents of a file, according to an embodiment of the present invention. Steps 301, 302, and 303 are similar to steps 201, 202, and 203 in FIG. 2. The same explanation given above with respect to FIG. 2 holds true in this case also.

In step 304, however, the ACL engine 114 analyzes the ACL 122 of the file 121 to check the operations allowed on this file 121 for the user of the application 100. While analyzing the ACL 122, if the ACL engine 114 finds any audit entry for the given user, it will record a log entry with information about the application and the user.

This invention introduces a mechanism at this step to obtain the stack trace of the thread at this instance and write it as part of the log entry. In addition to the stack trace, the name of the command that created the process, the user name, group id, and the time stamp are also added to the log entry to accurately identify the application. This stack trace and other information will enable easy identification of an offending application when the system administrator later analyzes the log entries. Steps 305 through 308 of FIG. 3 correspond to steps 204 through 207 of FIG. 2.

The mechanism to identify the sequence of function calls (call-chain) made by the thread that accessed the given file can be implemented by walking through the chain of stack frames starting from the current stack frame. In each stack frame the return address is noted, and based on those return addresses, the functions involved in the call chain are identified.

FIG. 4 illustrates how this invention can manipulate the command line tool: monitor_file_access. This tool is used to insert an audit entry into the ACL 122 of the file 121, and will cause subsequent file accesses to be logged into a system log file (as explained in FIG. 3). In step 401, the system administrator issues the monitor_file_access command specifying the name of the file to be monitored. In step 402, the monitor_file_access program will invoke a system call to insert the audit Access Control Entry (ACE) into the file 121's ACL 122. In step 403, the system call identifies the exact file system containing the file 121 and invokes that file system's set_acl operation to add a new ACE. In step 404, the file system's set_acl operation will invoke the ACL engine 114 to verify that the user has permissions to modify the ACL 122 and insert the new ACE. In step 405, the ACL engine 114 performs those functions and adds a new ACE into the ACL 122 of the file 121.

Note that the usage of the ACL 122 as illustrated in this exemplary embodiment is only one implementation of this invention. This invention can be implemented even in file systems which do not support an NFS Audit entry in the Access Control Lists 122, by maintaining a list of file names to be monitored for access within the kernel's Logical File System (LFS) 113 component. This list can be maintained at the system call layer, independent of the specific file system implementation. FIGS. 5 and 6 illustrate the sequence of steps taken when the monitoring is implemented in the LFS layer.

Referring to FIGS. 5 and 6, in step 501 the application opens a file 121 in write mode by calling the open( ) system call. In step 502, the LFS layer, which implements the open( ) system call, checks its internal table to find if the file is being monitored for write access. The list of monitored files gets into the LFS's internal table when the system administrator issues the monitor_file_access command as illustrated in steps 601 through 603. The LFS will call the Physical file system's open operation to perform the open function. If the open operation is successful, the Physical file system returns a handle to the LFS, which the LFS stores into its table and returns success to the application.

Later, when the application issues a write( ) system call on file 121 in step 503, the LFS will check its table in step 504, and if a match is found for the file 121 a log entry is created with the stack trace and other diagnostic information about the process that issued the write( ) system call. In steps 505 and 506, the physical file system performs the actual write operation to the file.

When a system administrator identifies that a particular file is being randomly modified, he/she can use the monitor_file_access tool to add an entry to the file's ACL 122 such that all subsequent accesses to that file will be recorded into a predefined log. From then on, whenever an application requests access to that file, the mechanisms described above will create a log record containing information about the application name and the sequence of function calls. The system administrator can view the log to identify which application is causing maintenance issues, and can send the function call-chain to the application developer or application vendor to facilitate further diagnosis, or to provide a code fix to prevent future such problems.

Using the mechanism as described in this disclosure, the system administrator requests the operating system to monitor these file[s] for all future undesirable modifications, and to provide the function call-chain and user information at the time of file modification. If no more undesirable modifications occur to these files, then the problem no longer exists. If the system error or problem occurs again, the mechanism provides sufficient information of the call-chain and calling process' identification, so that future recurrence of the problem can be avoided. This avoidance of future problem occurrences can be achieved by any of the following methods: a) by changing the permissions of the file[s], or b) by blocking the offending process' access, or c) by modifying the offending application's code.

Therefore, while there have been described what are presently considered to be the preferred embodiments, it will be understood by those skilled in the art that other modifications can be made within the spirit of the invention. The above descriptions of embodiments are not intended to be exhaustive or limiting in scope. The embodiments, as described, were chosen in order to explain the principles of the invention, show its practical application, and enable those with ordinary skill in the art to understand how to make and use the invention. It should be understood that the invention is not limited to the embodiments described above, but rather should be interpreted within the full meaning and scope of the appended claims.

We claim:

1. A method for monitoring access to a file within a file system in a computer, the method comprising steps of:
   inserting an audit entry to an access control list associated with the file, said entry directing the file system to record a log entry whenever a specific access is requested on said file;
   monitoring a plurality of requests for access to files;
   intercepting the requests;
   verifying that a requesting application has permission to modify the file;
   analyzing a metadata associated with the file;
   when the metadata comprises the audit entry used to invoke writing a log record, performing steps of:
      identifying information about the application requesting access to the file, including a sequence of function calls that preceded the file access request by:
         walking through a chain of stack frames of a thread of the requesting application, starting from a current stack frame;
         writing a stack trace, and other related information of the application accessing the file to the log entry to accurately identify the requesting application;
         noting a return address for each stack frame, wherein said return address indicates a caller of each function in a call chain; and
         identifying the functions in the call chain based on the return address;
      logging the information to generate an audit trail of the application; and
   granting or denying access to the file depending on the verifying step.

2. The method of claim 1 wherein writing the other related information comprises:
   recording a command name, user name, and timestamp of the application accessing the file.

3. The method of claim 1 further comprising a step of:
   informing the file system that file access has to be monitored and recorded.

4. The method of claim 2 wherein the audit entry comprises an audit to the filesystem to record the log entry whenever a specific access is requested on the file.

5. The method of claim 1 further comprising a step of:
   informing a system administrator that an undesirable file access or change has occurred.

6. The method of claim 1 wherein the inserting step comprises:
   using a command line tool to invoke a system call to insert the audit entry.

7. The method of claim 6, comprising steps of:
   identifying an exact file system containing the file;
   invoking that file system's file permission operation to add a new audit entry;
   verifying that a user has permission to modify the access control list; and
   inserting the audit entry.

8. The method of claim 1 further comprising:
   inserting the directive entry into a kernel logical file system component.

9. A multi-processor machine for monitoring file access, the machine comprising:
   a file system operable for monitoring accesses to a file residing within the file system;
   an access control mechanism configured to perform:
      inserting an audit entry to an access control list associated with the file, said entry directing the file system to record a loci entry whenever a specific access is requested on said file;
      intercepting the requests;
      verifying that a requesting application has permission to modify the file;
      analyzing an access control list associated with the file; and
      executing pre-defined actions when an unauthorized file access occurs;
   a tool to specify a list of the files to be monitored; and
   a storage device comprising instructions for invoking writing a log record whenever an audit entry is present in the access control list relating to the file monitored, said instructions comprising:
      identifying information about an application requesting access to the file, including a sequence of function calls that preceded the file access request by:
         walking through a chain of stack frames of a thread of the requesting application, starting from a current stack frame;
         writing a stack trace, name of command requesting the access, user name, group id, and time stamp to the log record to accurately identify the requesting application;
         noting a return address for each stack frame, wherein said return address indicates a caller of each function in a call chain; and
         identifying the functions in the call chain based on the return address; and logging the information to generate an audit trail of the application.

10. The multi-processor machine of claim 9 wherein the file system supports the monitoring of the file accesses, or permission changes to any given file in the file system.

11. The multi-processor machine of claim 9 wherein the file system supports dynamic changes of the list of the files to be monitored.

12. The multi-processor machine of claim 9 wherein said tool contains a method to inform the file system that a file access has to be monitored and recorded.

13. The multi-processor machine of claim 9 wherein said tool contains a method to inform the system administrator that an undesirable file access or change has occurred.

14. A computer program product embodied on a non-transitory computer readable medium and comprising code that, when executed, causes a computer to perform the following:
  inserting an audit entry to an access control list associated with a file, said entry directing a file system to record a loci entry whenever a specific access is requested on said file;
  monitor a plurality of requests for access to files;
  intercept the requests;
  verify that a requesting application has permission to modify the file;
  analyze an access control list associated with the file;
  when the access control list comprises the audit entry for invoking writing of a log record whenever said audit entry is present in said access control list relating to the file monitored:
    identify information about the application requesting access to the file, including a sequence of function calls that preceded the file access request by:
      walking through a chain of stack frames of a thread of the requesting application, starting from a current stack frame;
      writing a stack trace, and other related information of the application accessing the file to the loci entry, to accurately identify the requesting application;
      noting a return address for each stack frame, wherein said return address indicates a caller of each function in a call chain; and
      identifying the functions in the call chain based on the return address;
    log the information to generate an action trail of the application; and
  grant or deny access to the file depending on the verifying step.

15. The computer program product of claim 14, wherein the code further causes a computer to:
  insert the audit entry into a kernel logical file system component.

* * * * *